US012628171B2

(12) United States Patent
Fu et al.

(10) Patent No.: US 12,628,171 B2
(45) Date of Patent: May 12, 2026

(54) METHOD AND DEVICE FOR TRANSMITTING MAC PDU

(71) Applicant: GUANGDONG OPPO MOBILE TELECOMMUNICATIONS CORP., LTD., Guangdong (CN)

(72) Inventors: Zhe Fu, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 554 days.

(21) Appl. No.: 17/682,363

(22) Filed: Feb. 28, 2022

(65) Prior Publication Data

US 2022/0183051 A1 Jun. 9, 2022

Related U.S. Application Data

(63) Continuation of application No. PCT/CN2020/130826, filed on Nov. 23, 2020.
(Continued)

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1812* (2013.01); *H04L 1/1822* (2013.01);
(Continued)

(58) Field of Classification Search
None
See application file for complete search history.

(56) References Cited

U.S. PATENT DOCUMENTS

| 2018/0007669 A1 | 1/2018 | Yi et al. |
| 2018/0007689 A1 | 1/2018 | Patil et al. |

(Continued)

FOREIGN PATENT DOCUMENTS

| CN | 104159257 A | 11/2014 |
| CN | 107624261 A | 1/2018 |

(Continued)

OTHER PUBLICATIONS

U.S. Appl. No. 62/899,883 (Year: 2019).*
(Continued)

*Primary Examiner* — Jay L Vogel
(74) *Attorney, Agent, or Firm* — PERKINS COIE LLP

(57) ABSTRACT

A method and device for transmitting a medium access control (MAC) protocol data unit (PDU) is provided. The method includes: identifying, by a hybrid automatic repeat request (HARQ) entity, for an uplink grant, a HARQ process associated with the uplink grant; and obtaining, by the HARQ entity, a MAC PDU to transmit from a HARQ buffer of the identified HARQ process when a particular condition (s) is satisfied. The condition may be that a MAC entity of the HARQ entity is configured with priority based prioritization, the uplink grant is a configured grant, and a previous uplink grant for the HARQ process was de-prioritized and the MAC PDU had already been obtained for the HARQ process.

16 Claims, 3 Drawing Sheets

Related U.S. Application Data

(60) Provisional application No. 62/938,922, filed on Nov. 21, 2019.

(51) Int. Cl.

| | |
|---|---|
| *H04L 1/1822* | (2023.01) |
| *H04L 1/1829* | (2023.01) |
| *H04L 1/1867* | (2023.01) |
| *H04W 28/04* | (2009.01) |
| *H04W 72/1268* | (2023.01) |
| *H04W 72/566* | (2023.01) |
| *H04W 80/02* | (2009.01) |

(52) U.S. Cl.
CPC .......... *H04L 1/1835* (2013.01); *H04L 1/1848* (2013.01); *H04L 1/1854* (2013.01); *H04L 1/188* (2013.01); *H04L 1/1887* (2013.01); *H04W 28/04* (2013.01); *H04W 72/1268* (2013.01); *H04W 72/569* (2023.01); *H04L 1/1819* (2013.01); *H04W 80/02* (2013.01)

(56) References Cited

U.S. PATENT DOCUMENTS

| | | | | |
|---|---|---|---|---|
| 2018/0124827 | A1 | 5/2018 | Lee et al. | |
| 2019/0289638 | A1 * | 9/2019 | Kung ................ | H04W 74/0833 |
| 2021/0084674 | A1 * | 3/2021 | Wei ........................ | H04L 1/1822 |
| 2021/0105096 | A1 * | 4/2021 | Chin .................... | H04L 1/1812 |
| 2021/0144751 | A1 * | 5/2021 | Joseph ................ | H04W 72/115 |
| 2022/0345252 | A1 * | 10/2022 | Loehr ................... | H04L 1/1812 |
| 2022/0353899 | A1 * | 11/2022 | Xiao ........................ | H04L 1/188 |

FOREIGN PATENT DOCUMENTS

| | | | | | |
|---|---|---|---|---|---|
| CN | | 108886803 | A | 11/2018 | |
| CN | | 110278616 | A | 9/2019 | |
| CN | | 110447262 | A | 11/2019 | |
| JP | | 2017047404 | A | 3/2017 | |
| WO | | 2019213896 | A1 | 11/2019 | |
| WO | WO-2020094107 | A1 * | 5/2020 | ........... | H04L 1/1678 |
| WO | WO-2021009926 | A1 * | 1/2021 | | |
| WO | WO-2021059089 | A1 * | 4/2021 | .............. | H04L 1/08 |

OTHER PUBLICATIONS

International Search Report Mailed Feb. 18, 2021 In Application No. PCT/CN2020/130826.

3GPP TS 38.214 V15.7.0 (Sep. 2019), 3rd Generation Partnership Project; Technical Specification Group Radio Access Network; NR; Physical layer procedures for data, 105 pages.

3GPP TS 38.321 V16.5.0 (Jun. 2021), 3rd Generation Partnership Project; Technical Specification Group Radio Access Network; NR; Medium Access Control (MAC) protocol specification, 156 pages.

3GPP TS 38.331 V16.5.0 (Jun. 2021), 3rd Generation Partnership Project; Technical Specification Group Radio Access Network; NR; Radio Resource Control (RRC) protocol specification, 956 pages.

Peng Di, He Jian "Research and Analysis of TD-LTE Random Access Process by the UE Side",issued on Mar. 20, 2018, Ship Electronic Engineering, vol. 38 No. 3. 15 pages with English translation.

First Office Action of the Chinese application No. 202210173748.6, issued on Apr. 8, 2023. 32 pages with English translation.

Notice of Grant of the Chinese application No. 202210173748.6, issued on Jun. 30, 2023. 8 pages with English translation.

Examination Report for European Application No. 20888952.7 issued on May 23, 2023. 5 pages.

First Office Action of the Singapore Application No. 11202202333Q issued on Feb. 5, 2024, 13 pages.

R2-1812842, 3GPP TSG-RAN WG2 Meeting #103, Gothenburg, Sweden, Aug. 20-24, 2018, 7 pages.

Third Office Action of the European Application No. 20888952.7 issued on Apr. 17, 2024, 4 pages.

3GPP "Technical Specification: Evolved Universal Terrestrial Radio Access (E-UTRA); Medium Access Control (MAC) protocol specification (Release 15)" 3GPP TS 36.321 V15.7.0; 2019. 134 pages.

Examination Report for Indian Application No. 202227011239 issued Aug. 17, 2022. 6 pages with English translation.

Extended European Search Report for European Application No. 20888952.7 issued Sep. 9, 2022. 8 pages.

Intel Corporation "Further consideration on Configured UL grant enhancement" R2-1906274; 3GPP TSG-RAN WG2 106; Reno, Nevada, USA; May 13-17, 2019. 5 pages.

Examination Report for European Application No. 20888952.7 Issued Oct. 9, 2023, 5 Pages.

First Office Action of the Japanese application No. 2022-519107, issued on Oct. 25, 2024. 12 pages with English translation.

Hearing Notice of the Indian application No. 202227011239, issued on Mar. 18, 2025. 3 pages.

European search report of the EP application No. 25159765.4, issued on May 28, 2025. 8 pages.

Huawei et al: "UE autonomous transmission in a CG resource for deprioritized data," 3GPP Draft; R2-1914783, France, vol. RAN WG2, No. Reno, USA; Nov. 18-22, 2019.

Notice of Preliminary Rejection for Korean Patent Application No. 10-2022-7010105, issued on Feb. 11, 2026. 10 pages with English translation.

* cited by examiner

MAC PDU transmission device 400

HARQ entity 410

METHOD AND DEVICE FOR TRANSMITTING MAC PDU

CROSS-REFERENCE TO RELATED APPLICATION

The present application is a continuation application of International Application No. PCT/CN2020/130826, filed on Nov. 23, 2020, which claims the priority of US provisional application U.S. 62/938,922, filed on Nov. 21, 2019. The present application claims priority and the benefit of the above-identified applications and the above-identified applications are incorporated by reference herein in their entireties.

TECHNICAL FIELD

The present application relates to the field of communication technology, and in particular, to a method and device for transmitting a medium access control (MAC) protocol data unit (PDU).

BACKGROUND

In order to satisfy the increasingly higher requirement for communication in various aspects, a fifth generation (5G) New Radio (NR) wireless communication system has been developed.

A Hybrid Automatic Repeat reQuest (HARQ) mechanism is generally applied in a packet data transmission system to improve reliability of data transmission. Particularly, a HARQ process of a MAC layer of a receiving end feeds back an acknowledgement (ACK) to that of a sending end if a MAC PDU from the sending end is successfully received at the receiving end, and feeds back a negative acknowledgement (NACK) to that of the sending end if the MAC PDU is not successfully received, so that a retransmission of the MAC PDU can be performed.

The HARQ mechanism is also applied in the NR communication system, and there is a need for further improvement in methods for transmitting MAC PDUs by utilizing the HARQ mechanism in the NR communication system.

SUMMARY

Implementations of the present disclosure provide a method and device for transmitting a medium access control (MAC) protocol data unit (PDU).

In a first aspect, a method for transmitting a MAC PDU is provided. The method includes: identifying, by a hybrid automatic repeat request (HARQ) entity, for an uplink grant, a HARQ process associated with the uplink grant; and obtaining, by the HARQ entity, a MAC PDU to transmit from a HARQ buffer of the identified HARQ process when at least one of following conditions is satisfied: a MAC entity of the HARQ entity is configured with priority based prioritization, the uplink grant is a configured grant, and a previous uplink grant for the HARQ process was de-prioritized and the MAC PDU had already been obtained for the HARQ process; the uplink grant is a configured grant, the previous uplink grant for the HARQ process was de-prioritized and the MAC PDU had already been obtained for the HARQ process, a previous configured grant for the identified HARQ process was de-prioritized and the MAC PDU obtained in the HARQ buffer had not been successfully transmitted due to overlapping of a physical uplink shared channel (PUSCH) duration of the previous uplink grant with a PUSCH duration of another uplink grant; or the MAC entity is configured with priority based prioritization, the previous configured grant for the identified HARQ process was de-prioritized and the MAC PDU obtained in the HARQ buffer had not been successfully transmitted due to the overlapping.

In a second aspect, a method for transmitting a MAC PDU is provided. The method includes: delivering, by a MAC entity, a configured uplink grant and associated HARQ information to a HARQ entity of the MAC entity when at least one of following conditions is satisfied: a previous uplink grant delivered to the HARQ entity for a same HARQ process was a configured uplink grant which was de-prioritized; a MAC PDU obtained in a HARQ buffer of the HARQ process had not been successfully transmitted due to overlapping of a PUSCH duration of the previous uplink grant with a PUSCH duration of another uplink grant; the previous configured grant for the HARQ process was de-prioritized and the MAC PDU obtained in the HARQ buffer of the HARQ process had not been successfully transmitted due to the overlapping; the MAC entity is configured with priority based prioritization and the previous uplink grant delivered to the HARQ entity for the same HARQ process was a configured uplink grant which was de-prioritized; the MAC entity is configured with priority based prioritization and the MAC PDU obtained in the HARQ buffer of the HARQ process had not been successfully transmitted due to the overlapping; or the MAC entity is configured with priority based prioritization and the previous configured grant for the HARQ process was de-prioritized and the MAC PDU obtained in the HARQ buffer of the HARQ process had not been successfully transmitted due to the overlapping; delivering, by the HARQ entity, the uplink grant and the HARQ information of a transport block (TB) to the HARQ process; and instructing, by the HARQ entity, the HARQ process to trigger a retransmission.

In a third aspect, a device for transmitting a MAC PDU is provided. The device includes a HARQ entity configured to: identify, for an uplink grant, a HARQ process associated with the uplink grant; and obtain a MAC PDU to transmit from a HARQ buffer of the identified HARQ process when at least one of following conditions is satisfied: a MAC entity of the HARQ entity is configured with priority based prioritization, the uplink grant is a configured grant, and a previous uplink grant for the HARQ process was de-prioritized and the MAC PDU had already been obtained for the HARQ process; the uplink grant is a configured grant, the previous uplink grant for the HARQ process was de-prioritized and the MAC PDU had already been obtained for the HARQ process; a previous configured grant for the identified HARQ process was de-prioritized and the MAC PDU obtained in the HARQ buffer had not been successfully transmitted due to overlapping of a physical uplink shared channel (PUSCH) duration of the previous uplink grant with a PUSCH duration of another uplink grant; or the MAC entity is configured with priority based prioritization, the previous configured grant for the identified HARQ process was de-prioritized and the MAC PDU obtained in the HARQ buffer had not been successfully transmitted due to the overlapping.

In a fourth aspect, a device for transmitting a MAC PDU is provided. The device includes a MAC entity, and the MAC entity includes a HARQ entity.

The MAC entity is configured to deliver a configured uplink grant and associated HARQ information to the HARQ entity when at least one of following conditions is satisfied: a previous uplink grant delivered to the HARQ entity for a same HARQ process was a configured uplink grant which was de-prioritized; a MAC PDU obtained in a HARQ buffer of the HARQ process had not been successfully transmitted due to overlapping of a physical uplink shared channel (PUSCH) duration of the previous uplink grant with a PUSCH duration of another uplink grant; the previous configured grant for the HARQ process was de-prioritized and the MAC PDU obtained in the HARQ buffer of the HARQ process had not been successfully transmitted due to the overlapping; the MAC entity is configured with priority based prioritization and the previous uplink grant delivered to the HARQ entity for the same HARQ process was a configured uplink grant which was de-prioritized; the MAC entity is configured with priority based prioritization and the MAC PDU obtained in the HARQ buffer of the HARQ process had not been successfully transmitted due to the overlapping; or the MAC entity is configured with priority based prioritization and the previous configured grant for the HARQ process was de-prioritized and the MAC PDU obtained in the HARQ buffer of the HARQ process had not been successfully transmitted due to the overlapping.

The HARQ entity is configured to: deliver the uplink grant and the HARQ information of a transport block (TB) to the HARQ process; and instruct the HARQ process to trigger a retransmission.

A better understanding of the nature and advantages of implementations of the present disclosure may be gained with reference to the following detailed description and the accompanying drawings.

DETAILED DESCRIPTION

The technical solutions of exemplary implementations of the present disclosure will be described below with reference to the accompanying drawings. It should be understood that the exemplary implementations are intended for better understanding of the technical solutions of the present disclosure, rather than limiting the scope of the application, and skilled artisans would understand that the exemplary implementations and features herein may be combined according to actual needs.

The acts shown in the flowchart of the accompanying drawings may be performed at least in part by a computer system storing a set of computer-executable instructions. In addition, although a logical sequence is shown in the flowchart, in some cases the acts shown or described may be performed in a different sequence, or some acts may not be performed at all.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a long term evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, a New Radio (NR) system or fifth-generation (5G) system, or a further communication system.

Figure 1:
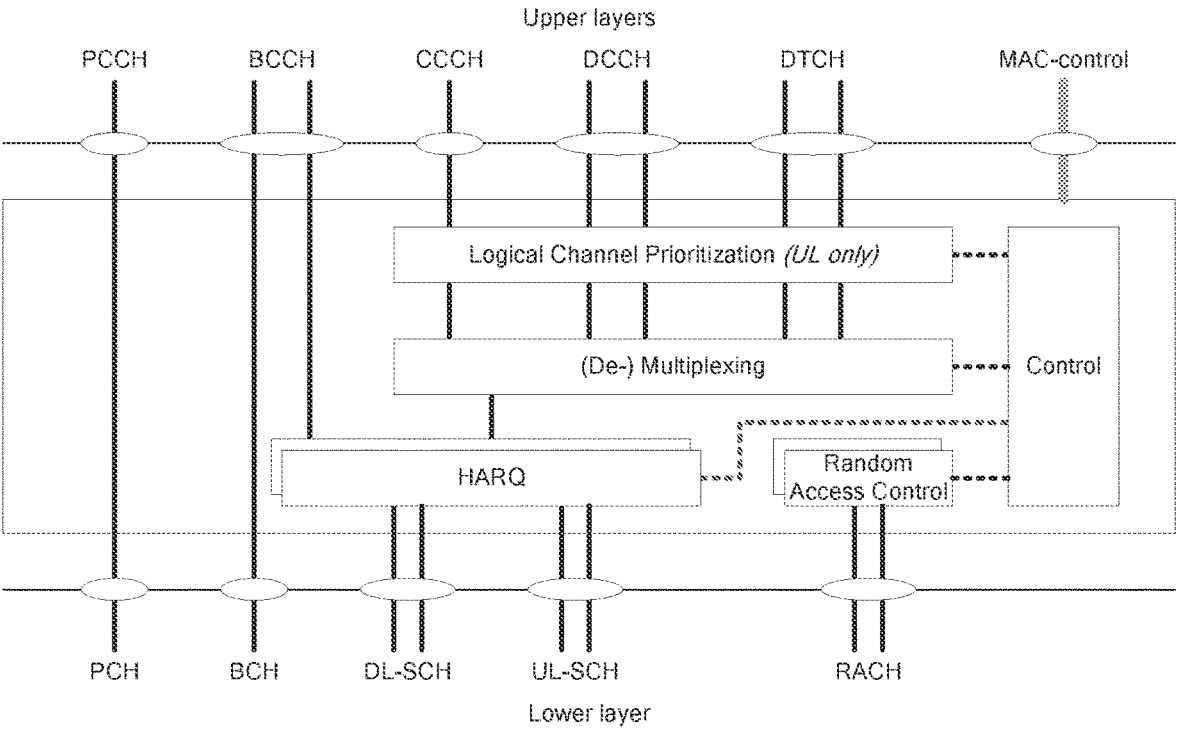
FIG. 1 shows an example of an architecture of a MAC layer.

FIG. 1 shows an example of an architecture of a MAC layer. The MAC layer may include a HARQ entity, a multiplexing/de-multiplexing entity, a logical channel prioritization entity, and a control entity. The multiplexing and de-multiplexing entity may be in charge of composing and decomposing the MAC PDUs and performs (de-)multiplexing of data from several logical channels into/from one transport channel. When radio resources for a new transmission are allocated, the logical channel prioritization entity may instruct the multiplexing and de-multiplexing entity to generate MAC PDUs from MAC service data units (SDUs). The HARQ entity may perform the transmit HARQ operation and the receive HARQ operation. The control entity may be responsible for a number of functions such as DRX, resource requests, alignment of the uplink timing, power headroom reporting, and so on. Logical channels in upper layers may include Paging Control Channel (PCCH), Broadcast Control Channel (BCCH), Common Control Channel (CCCH), Dedicated Control Channel (DCCH) and Dedicated Traffic Channel (DTCH). Transport channels in a lower layer may include Paging Channel (PCH), Broadcast Channel (BCH), Downlink Shared Channel (DL-SCH), Uplink Shared Channel (UL-SCH) and Random Access Channel (RACH).

At present, there is a need for support for UE autonomous retransmission in a configured grant (CG) resource, either as a re-transmission or as a new transmission. For example, in collision case, the CG is deprioritized/pre-empted by another UL resource with a higher priority.

And UE may do autonomous retransmission for the deprioritized/pre-empted CG. However, how to implement the autonomous retransmission for CG has not been specified so far.

Autonomous retransmission may be based on a new timer (i.e. timer expiry=HARQ NACK) on configured grant. The new timer is started when the transport block (TB) is actually transmitted on the configured grant and stopped upon reception of HARQ feedback, e.g., downlink feedback information (DFI), or dynamic grant for the HARQ process. There is also a need for specifying the condition for starting or restarting the timer.

Figure 2:
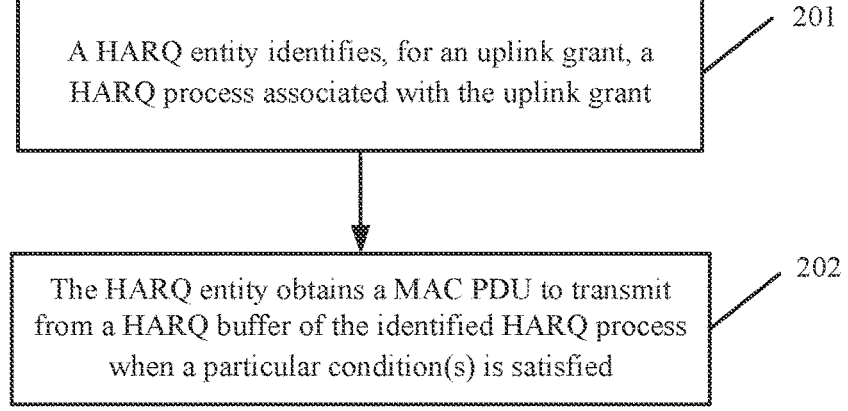
FIG. 2 shows a flowchart of a method for transmitting a MAC PDU according to an implementation of the present disclosure.

FIG. 2 shows a flowchart of a method for transmitting a MAC PDU according to an implementation of the present disclosure. As shown in FIG. 2, the method includes acts 201-202.

In act 201, a HARQ entity identifies, for an uplink grant, a HARQ process associated with the uplink grant.

In act 202, the HARQ entity obtains a MAC PDU to transmit from a HARQ buffer of the identified HARQ process when a particular condition(s) is satisfied. Specifically, the HARQ entity obtains a MAC PDU to transmit from a HARQ buffer of the identified HARQ process when at least one of following conditions is satisfied: a MAC entity of the HARQ entity is configured with priority based prioritization, the uplink grant is a configured grant, and a previous uplink grant for the HARQ process was de-prioritized and the MAC PDU had already been obtained for the HARQ process; the uplink grant is a configured grant, the previous uplink grant for the HARQ process was de-prioritized and the MAC PDU had already been obtained for the HARQ process; a previous configured grant for the identified HARQ process was de-prioritized and the MAC PDU obtained in the HARQ buffer had not been successfully transmitted due to overlapping of a physical uplink shared channel (PUSCH) duration of the previous uplink grant with a PUSCH duration of another uplink grant; or the MAC entity is configured with priority based prioritization, the previous configured grant for the identified HARQ process was de-prioritized and the MAC PDU obtained in the HARQ buffer had not been successfully transmitted due to the overlapping.

In an exemplary implementation, the method may further include: the HARQ entity obtains an MAC PDU to transmit from a multiplexing and assembly entity, when the MAC entity is not configured with priority based prioritization, or when the MAC entity is configured with priority based prioritization and the uplink grant is a prioritized uplink grant.

In an exemplary implementation, the method may further include: after obtaining the MAC PDU to transmit, the HARQ entity delivers the MAC PDU and the uplink grant and HARQ information of a TB to the identified HARQ process; and the HARQ entity instructs the identified HARQ process to trigger a new transmission; wherein when the HARQ process is configured with a configured grant timer, the configured grant timer is not started or restarted when at least one of following conditions is satisfied: the MAC entity is configured with priority based prioritization and the uplink grant is a de-prioritized configured grant; or the MAC entity is configured with priority based prioritization, the uplink grant is a configured uplink grant and the uplink grant is a deprioritized uplink grant.

In an exemplary implementation, the method may further include: after obtaining the MAC PDU to transmit, the HARQ entity delivers the MAC PDU and the uplink grant and HARQ information of a TB to the identified HARQ process; the HARQ entity instructs the identified HARQ process to trigger a new transmission; and when the HARQ process is configured with a configured grant timer, the HARQ entity starts or restarts the configured grant timer when the transmission is finished, or when the transmission succeeds, or at the end of a corresponding PUSCH transmission, or after the end of the corresponding PUSCH transmission, or in the first symbol after the end of the corresponding PUSCH transmission, or at the end of a corresponding PUSCH occasion, or when the MAC entity determines that the transmission is performed, or when the MAC entity determines that the transmission is not dropped or de-prioritized, or after the end of the corresponding PUSCH occasion.

In an exemplary implementation, the method may further include: the MAC entity delivers the configured uplink grant and associated HARQ information to the HARQ entity when at least one of following conditions is satisfied: the previous uplink grant delivered to the HARQ entity for the same HARQ process was a configured uplink grant which was de-prioritized; the MAC PDU obtained in the HARQ buffer of the identified HARQ process had not been successfully transmitted due to the overlapping; the previous configured grant for the identified HARQ process was de-prioritized and the MAC PDU obtained in the HARQ buffer of the HARQ process had not been successfully transmitted; the MAC entity is configured with priority based prioritization and the previous uplink grant delivered to the HARQ entity for the same HARQ process was a configured uplink grant which was de-prioritized; the MAC entity is configured with priority based prioritization and the MAC PDU obtained in the HARQ buffer of the identified HARQ process had not been successfully transmitted due to the overlapping; or the MAC entity is configured with priority based prioritization and the previous configured grant for the identified HARQ process was de-prioritized and the MAC PDU obtained in the HARQ buffer of the HARQ process had not been successfully transmitted due to the overlapping.

In an exemplary implementation, the method may further include: after obtaining the MAC PDU to transmit, the HARQ entity delivers the MAC PDU and the uplink grant and HARQ information of a TB to the identified HARQ process; the HARQ entity instructs the identified HARQ process to trigger a new transmission; and when the HARQ process is configured with a configured grant timer, the HARQ entity starts or restarts the configured grant timer.

In an exemplary implementation, starting or restarting the configured grant timer may include: starting or restarting the configured grant timer when the transmission is started, or at the start time of a corresponding PUSCH transmission, or after the start time of the corresponding PUSCH transmission, or at the first symbol of the corresponding PUSCH transmission, or after the first symbol of the corresponding PUSCH transmission, or when the MAC entity determines that the transmission is performed, or when the transmission is not dropped or not deprioritized.

Figures 3, 4:
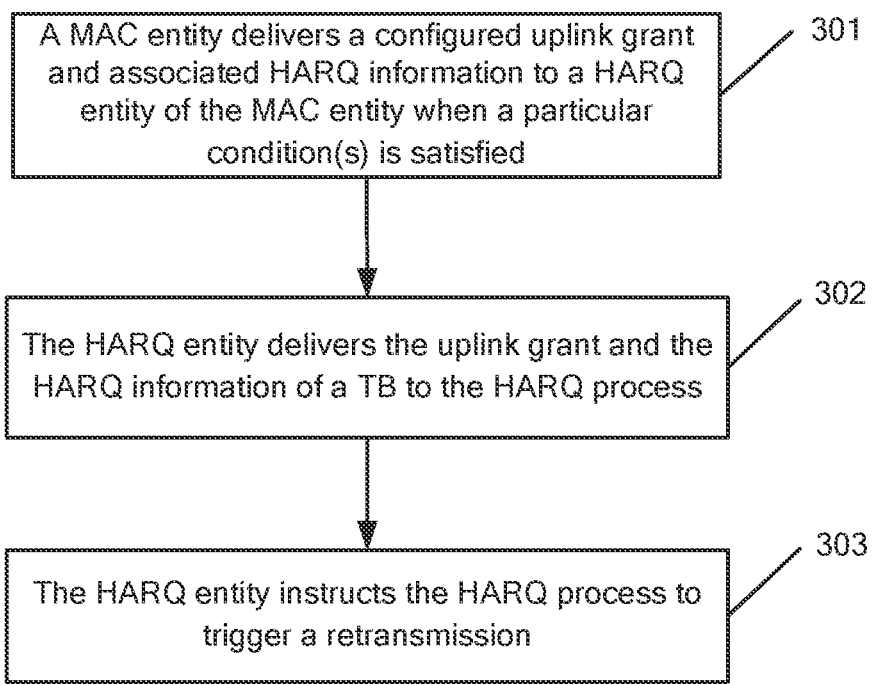
FIG. 3 shows a flowchart of a method for transmitting a MAC PDU according to an implementation of the present disclosure.
FIG. 4 shows structure of a device for transmitting a MAC PDU according to an implementation of the present disclosure.

FIG. 3 shows a flowchart of a method for transmitting a MAC PDU according to an implementation of the present disclosure. As shown in FIG. 3, the method includes acts 301-303.

In act 301, A MAC entity delivers a configured uplink grant and associated HARQ information to a HARQ entity of the MAC entity when at least one of following conditions is satisfied; a previous uplink grant delivered to the HARQ entity for a same HARQ process was a configured uplink grant which was de-prioritized; a MAC PDU obtained in a HARQ buffer of the HARQ process had not been successfully transmitted due to overlapping of a PUSCH duration of the previous uplink grant with a PUSCH duration of another uplink grant; the previous configured grant for the HARQ process was de-prioritized and the MAC PDU obtained in the HARQ buffer of the HARQ process had not been successfully transmitted due to the overlapping; the MAC entity is configured with priority based prioritization and the previous uplink grant delivered to the HARQ entity for the same HARQ process was a configured uplink grant which was de-prioritized; the MAC entity is configured with priority based prioritization and the MAC PDU obtained in the HARQ buffer of the HARQ process had not been successfully transmitted due to the overlapping; or the MAC entity is configured with priority based prioritization and the previous configured grant for the HARQ process was de-prioritized and the MAC PDU obtained in the HARQ buffer of the HARQ process had not been successfully transmitted due to the overlapping.

In act 302, the HARQ entity delivers the uplink grant and the HARQ information of a TB to the HARQ process.

In act 303, the HARQ entity instructs the HARQ process to trigger a retransmission.

In an exemplary implementation, the method may further include: when the HARQ process is configured with a configured grant timer, the HARQ entity starts or restarts the configured grant timer when the retransmission is performed, if at least one of following conditions is satisfied: the MAC entity is configured with priority based prioritization and the uplink grant is a configured uplink grant; or the MAC entity is configured with priority based prioritization and the uplink grant is a configured uplink grant, and the previous uplink grant for the HARQ process is a de-prioritized configured grant.

In an exemplary implementation, the method may further include: the HARQ entity identifies, for the uplink grant, the HARQ process associated with the uplink grant; and in response to obtaining a MAC PDU, the HARQ entity delivers the MAC PDU and the uplink grant and HARQ information of the TB to the identified HARQ process; the HARQ entity instructs the identified HARQ process to trigger a new transmission; and when the HARQ process is configured with a configured grant timer, the configured grant timer is started or restarted when at least one of following conditions is satisfied: the MAC entity is configured with priority based prioritization and the uplink grant is a de-prioritized configured grant; or the MAC entity is configured with priority based prioritization, the uplink grant is a configured uplink grant and the uplink grant is a deprioritized uplink grant.

In an exemplary implementation, the method may further include: the HARQ entity identifies, for the uplink grant, the HARQ process associated with the uplink grant; and in response to obtaining a MAC PDU, the HARQ entity delivers the MAC PDU and the uplink grant and HARQ information of the TB to the identified HARQ process, the HARQ entity instructs the identified HARQ process to trigger a new transmission; and when the HARQ process is configured with a configured grant timer, the configured grant timer is started or restarted.

In an exemplary implementation, starting or restarting the configured grant timer may include: starting or restarting the configured grant timer when the transmission is started, or at the start time of a corresponding PUSCH transmission, or after the start time of the corresponding PUSCH transmission, or at the first symbol of the corresponding PUSCH transmission, or after the first symbol of the corresponding PUSCH transmission, or when the MAC entity determines that the transmission is performed, or when the transmission is not dropped or not deprioritized.

For further understanding of the technical solutions of the present disclosure, example implementations are provided below. In particular, one of ordinary skill in the art could understand that the numerals such as "1>", "2>", etc. therein are for ease of understanding the logic of the procedures of the example implementations, but not intended to limit the content of the procedures in the example implementations.

Example 1: If/Assume CG Timer is not Running

For each uplink grant, the HARQ entity shall:
1> identify the HARQ process associated with this grant, and for each identified HARQ process:
2> if the received grant was not addressed to a Temporary Cell-Radio Network Temporary Identifier (C-RNTI) on Physical Downlink Control Channel (PDCCH), and the New Data Indicator (NDI) provided in the associated HARQ information has been toggled compared to the value in the previous transmission of this TB of this HARQ process; or 2> if the uplink grant was received on PDCCH for the C-RNTI and the HARQ buffer of the identified process is empty; or
2> if the uplink grant was received in a Random Access Response; or
2> if the uplink grant was received on PDCCH for the C-RNTI in ra-ResponseWindow and this PDCCH successfully completed the Random Access procedure initiated for beam failure recovery; or
2> if the uplink grant is part of a bundle of the configured uplink grant, and may be used for initial transmission according to clause 6.1.2.3 of TS 38.214, and if no MAC PDU has been obtained for this bundle:
3> if there is a MAC PDU in the Msg3 buffer and the uplink grant was received in a Random Access Response; or:
3> if there is a MAC PDU in the Msg3 buffer and the uplink grant was received on PDCCH for the C-RNTI in ra-ResponseWindow and this PDCCH successfully completed the Random Access procedure initiated for beam failure recovery:
4> obtain the MAC PDU to transmit from the Msg3 buffer.
4> if the uplink grant size does not match with size of the obtained MAC PDU; and
4> if the Random Access procedure was successfully completed upon receiving the uplink grant:
5> indicate to the Multiplexing and assembly entity to include MAC subPDU(s) carrying MAC SDU from the obtained MAC PDU in the subsequent uplink transmission;
5> obtain the MAC PDU to transmit from the Multiplexing and assembly entity.
3> else if the MAC entity is configured with prioriyBasedPrioritization and this uplink grant is a configured grant and the previous uplink grant for this HARQ process was de-prioritized and a MAC PDU had already been obtained for this HARQ process; (there are also three alternative schemes for this "3> else if" which are listed in the followings:
or
else if this uplink grant is a configured grant and the previous uplink grant for this HARQ process was de-prioritized and a MAC PDU had already been obtained for this HARQ process;
or
else if the previous configured grant for the identified HARQ process was de-prioritized and a MAC PDU obtained in this HARQ buffer had not been (successful) transmitted (due to overlapping);
or
else if the MAC entity is configured with priorityBasedPrioritization and the previous configured grant for the identified HARQ process was de-prioritized and a MAC PDU obtained in this HARQ buffer had not been (successful) transmitted (due to overlapping);
4> obtain the MAC PDU to transmit from the HARQ buffer of the identified HARQ process.
3> else:
4> if the MAC entity is not configured with priorityBasedPrioritization; or
4> if the MAC entity is configured with priorityBasedPrioritization and this uplink grant is a prioritized uplink grant:

5> obtain the MAC PDU to transmit from the Multiplexing and assembly entity, if any:

3> if a MAC PDU to transmit has been obtained:

4> deliver the MAC PDU and the uplink grant and the HARQ information of the TB to the identified HARQ process:

4> instruct the identified HARQ process to trigger a new transmission;

4> if the MAC entity is configured with priorityBasedPrioritization and the uplink grant is a de-prioritized configured grant:

or if the MAC entity is configured with priorityBasedPrioritization, the uplink grant is a configured uplink grant and this uplink grant is a deprioritized uplink grant:

5> Not start or restart the configuredGrantTimer, if configured, for the corresponding HARQ process.

4> if the uplink grant is addressed to Configured Scheduling RNTI (CS-RNTI); or

4> if the uplink grant is a configured uplink grant; or

4> if the uplink grant is addressed to C-RNTI, and the identified HARQ process is configured for a configured uplink grant:

5> start or restart the configuredGrantTimer, if configured, for the corresponding HARQ process when the transmission is performed.

3> else:

4> flush the HARQ buffer of the identified HARQ process.

2> else (i.e. retransmission):

3> if the uplink grant received on PDCCH was addressed to CS-RNTI and if the HARQ buffer of the identified process is empty; or 3> if the uplink grant is part of a bundle and if no MAC PDU has been obtained for this bundle; or 3> if the uplink grant is part of a bundle of the configured uplink grant, and the PUSCH duration of the uplink grant overlaps with a PUSCH duration of another uplink grant received on the PDCCH or in a Random Access Response for this Serving Cell; or 3> if the MAC entity is configured with priorityBasedPrioritization and this uplink grant is not a prioritized uplink grant:

4> ignore the uplink grant.

3> else:

4> deliver the uplink grant and the HARQ information (redundancy version) of the TB to the identified HARQ process;

4> instruct the identified HARQ process to trigger a retransmission;

4> if the uplink grant is addressed to CS-RNTI; or

4> if the uplink grant is addressed to C-RNTI, and the identified HARQ process is configured for a configured uplink grant:

5> start or restart the configuredGrantTimer, if configured, for the corresponding HARQ process when the transmission is performed.

When determining if NDI has been toggled compared to the value in the previous transmission the MAC entity shall ignore NDI received in all uplink grants on PDCCH for its Temporary C-RNTI.

Example 2: If/Assume CG Timer is not Running

For each uplink grant, the HARQ entity shall:

1> identify the HARQ process associated with this grant, and for each identified HARQ process:

2> if the received grant was not addressed to a Temporary C-RNTI on PDCCH, and the NDI provided in the associated HARQ information has been toggled compared to the value in the previous transmission of this TB of this HARQ process; or 2> if the uplink grant was received on PDCCH for the C-RNTI and the HARQ buffer of the identified process is empty; or 2> if the uplink grant was received in a Random Access Response; or 2> if the uplink grant was received on PDCCH for the C-RNTI in ra-ResponseWindow and this PDCCH successfully completed the Random Access procedure initiated for beam failure recovery; or 2> if the uplink grant is part of a bundle of the configured uplink grant, and may be used for initial transmission according to clause 6.1.2.3 of TS 38.214, and if no MAC PDU has been obtained for this bundle:

3> if there is a MAC PDU in the Msg3 buffer and the uplink grant was received in a Random Access Response; or:

3> if there is a MAC PDU in the Msg3 buffer and the uplink grant was received on PDCCH for the C-RNTI in ra-ResponseWindow and this PDCCH successfully completed the Random Access procedure initiated for beam failure recovery:

4> obtain the MAC PDU to transmit from the Msg3 buffer.

4> if the uplink grant size does not match with size of the obtained MAC PDU; and 4> if the Random Access procedure was successfully completed upon receiving the uplink grant:

5> indicate to the Multiplexing and assembly entity to include MAC subPDU(s) carrying MAC SDU from the obtained MAC PDU in the subsequent uplink transmission;

5> obtain the MAC PDU to transmit from the Multiplexing and assembly entity.

3> else if the MAC entity is configured with priorityBasedPrioritization and this uplink grant is a configured grant and the previous uplink grant for this HARQ process was de-prioritized and a MAC PDU had already been obtained for this HARQ process: (there are also three alternative schemes for this "3> else if" which are listed in the followings:

or else if this uplink grant is a configured grant and the previous uplink grant for this HARQ process was de-prioritized and a MAC PDU had already been obtained for this HARQ process;

or else if the previous configured grant for the identified HARQ process was de-prioritized and a MAC PDU obtained in this HARQ buffer had not been (successful) transmitted (due to overlapping);

or else if the MAC entity is configured with priorityBasedPrioritization and the previous configured grant for the identified HARQ process was de-prioritized and a MAC PDU obtained in this HARQ buffer had not been (successful) transmitted (due to overlapping);

>> 4> obtain the MAC PDU to transmit from the HARQ buffer of the identified HARQ process.

>> 3> else:

>>> 4> if the MAC entity is not configured with priorityBasedPrioritization; or

>>> 4> if the MAC entity is configured with priority-BasedPrioritization and this uplink grant is a prioritized uplink grant:

>>>> 5> obtain the MAC PDU to transmit from the Multiplexing and assembly entity, if any;

>> 3> if a MAC PDU to transmit has been obtained:

>>> 4> deliver the MAC PDU and the uplink grant and the HARQ information of the TB to the identified HARQ process:

>>> 4> instruct the identified HARQ process to trigger a new transmission;

>>> 4> if the uplink grant is addressed to CS-RNTI; or

>>> 4> if the uplink grant is a configured uplink grant; or

>>> 4> if the uplink grant is addressed to C-RNTI, and the identified HARQ process is configured for a configured uplink grant:

>>>> 5> start or restart the configuredGrantTimer, if configured, for the corresponding HARQ process when the transmission is finished;

or when the transmission succeed;

or at the end of the corresponding PUSCH transmission;

or after the end of the corresponding PUSCH transmission;

or in the first symbol after the end of the corresponding PUSCH transmission;

or at the end of the corresponding PUSCH occasion;

or when the transmission is performed (as MAC considered);

or when the transmission is not dropped or deprioritized (as MAC considered);

or after the end of the corresponding PUSCH occasion.

(the above description with bold characters can be a note or additional condition)

>> 3> else:

>>> 4> flush the HARQ buffer of the identified HARQ process.

> 2> else (i.e. retransmission):

>> 3> if the uplink grant received on PDCCH was addressed to CS-RNTI and if the HARQ buffer of the identified process is empty; or >> 3> if the uplink grant is part of a bundle and if no MAC PDU has been obtained for this bundle; or >> 3> if the uplink grant is part of a bundle of the configured uplink grant, and the PUSCH duration of the uplink grant overlaps with a PUSCH duration of another uplink grant received on the PDCCH or in a Random Access Response for this Serving Cell; or >> 3> if the MAC entity is configured with priority-BasedPrioritization and this uplink grant is not a prioritized uplink grant:

>>> 4> ignore the uplink grant.

>> 3> else:

>>> 4> deliver the uplink grant and the HARQ information (redundancy version) of the TB to the identified HARQ process;

>>> 4> instruct the identified HARQ process to trigger a retransmission:

>>> 4> if the uplink grant is addressed to CS-RNTI; or

>>> 4> if the uplink grant is addressed to C-RNTI, and the identified HARQ process is configured for a configured uplink grant:

>>>> 5> start or restart the configuredGrantTimer, if configured, for the corresponding HARQ process when the transmission is performed.

When determining if NDI has been toggled compared to the value in the previous transmission the MAC entity shall ignore NDI received in all uplink grants on PDCCH for its Temporary C-RNTI.

Example 3: If/Assume CG Timer is Running

For each Serving Cell and each configured uplink grant, if configured and activated, the MAC entity shall:

> 1> if the MAC entity is configured with priorityBasedPrioritization; or

> 1> if the PUSCH duration of the configured uplink grant does not overlap with the PUSCH duration of an uplink grant received on the PDCCH or in a Random Access Response for this Serving Cell:

>> 2> set the HARQ Process ID to the HARQ Process ID associated with this PUSCH duration.

>> 2> if the configuredGrantTimer for the corresponding HARQ process is not running; or >> 2> if A:

>>> 3> consider the NDI bit for the corresponding HARQ process to have been toggled;

>>> 3> deliver the configured uplink grant and the associated HARQ information to the HARQ entity.

A:

the previous uplink grant delivered to the HARQ entity for the same HARQ process was a configured uplink grant which was de-prioritized (i.e. retransmission on configured grant);

or a MAC PDU obtained in the identified HARQ buffer had not been (successful) transmitted (due to overlapping);

or the previous configured grant for the identified HARQ process was de-prioritized and a MAC PDU obtained in this HARQ buffer had not been (successful) transmitted (due to overlapping);

or the MAC entity is configured with priorityBasedPrioritization and the previous uplink grant delivered to the HARQ entity for the same HARQ process was a configured uplink grant which was de-prioritized (i.e. retransmission on configured grant);

or the MAC entity is configured with priorityBasedPrioritization and a MAC PDU obtained in the identified HARQ buffer had not been (successful) transmitted (due to overlapping);

or the MAC entity is configured with priorityBasedPrioritization and the previous configured grant for the identified HARQ process was de-prioritized and a MAC PDU obtained in this HARQ buffer had not been (successful) transmitted (due to overlapping);

(All the above options can be additional with the configuredGrantTimer for the corresponding HARQ process is running)

For each uplink grant, the HARQ entity shall:

1> identify the HARQ process associated with this grant, and for each identified HARQ process:

2> if the received grant was not addressed to a Temporary C-RNTI on PDCCH, and the NDI provided in the associated HARQ information has been toggled compared to the value in the previous transmission of this TB of this HARQ process; or 2> if the uplink grant was received on PDCCH for the C-RNTI and the HARQ buffer of the identified process is empty; or 2> if the uplink grant was received in a Random Access Response; or 2> if the uplink grant was received on PDCCH for the C-RNTI in ra-ResponseWindow and this PDCCH successfully completed the Random Access procedure initiated for beam failure recovery; or 2> if the uplink grant is part of a bundle of the configured uplink grant, and may be used for initial transmission according to clause 6.1.2.3 of TS 38.214, and if no MAC PDU has been obtained for this bundle:

3> if there is a MAC PDU in the Msg3 buffer and the uplink grant was received in a Random Access Response; or:

3> if there is a MAC PDU in the Msg3 buffer and the uplink grant was received on PDCCH for the C-RNTI in ra-ResponseWindow and this PDCCH successfully completed the Random Access procedure initiated for beam failure recovery:

4> obtain the MAC PDU to transmit from the Msg3 buffer.

4> if the uplink grant size does not match with size of the obtained MAC PDU; and 4> if the Random Access procedure was successfully completed upon receiving the uplink grant:

5> indicate to the Multiplexing and assembly entity to include MAC subPDU(s) carrying MAC SDU from the obtained MAC PDU in the subsequent uplink transmission;

5> obtain the MAC PDU to transmit from the Multiplexing and assembly entity.

3> else if the MAC entity is configured with priorityBasedPrioritization and this uplink grant is a configured grant and the previous uplink grant for this HARQ process was de-prioritized and a MAC PDU had already been obtained for this HARQ process: (there are also three alternative schemes for this "3> else if" which are listed in the followings:

or else if this uplink grant is a configured grant and the previous uplink grant for this HARQ process was de-prioritized and a MAC PDU had already been obtained for this HARQ process;

or else if the previous configured grant for the identified HARQ process was de-prioritized and a MAC PDU obtained in this HARQ buffer had not been (successful) transmitted (due to overlapping);

or else if the MAC entity is configured with priorityBasedPrioritization and the previous configured grant for the identified HARQ process was de-prioritized and a MAC PDU obtained in this HARQ buffer had not been (successful) transmitted (due to overlapping);

4> obtain the MAC PDU to transmit from the HARQ buffer of the identified HARQ process.

3> else:

4> if the MAC entity is not configured with priorityBasedPrioritization; or

4> if the MAC entity is configured with priorityBasedPrioritization and this uplink grant is a prioritized uplink grant:

5> obtain the MAC PDU to transmit from the Multiplexing and assembly entity, if any;

3> if a MAC PDU to transmit has been obtained:

4> deliver the MAC PDU and the uplink grant and the HARQ information of the TB to the identified HARQ process;

4> instruct the identified HARQ process to trigger a new transmission;

4> if the uplink grant is addressed to CS-RNTI; or

4> if the uplink grant is a configured uplink grant or

4> if the uplink grant is addressed to C-RNTI, and the identified HARQ process is configured for a configured uplink grant:

5> start or restart the configuredGrantTimer, if configured, for the corresponding HARQ process when the transmission is started;

or at or after the start time of the corresponding PUSCH transmission;

or at the first symbol of the corresponding PUSCH transmission;

or after the first symbol of the corresponding PUSCH transmission;

or when the transmission is performed (as MAC assumed or as MAC considered);

or when the transmission is not dropped or not deprioritized;

or with no condition. (the above description can be a note or additional condition)

3> else:

4> flush the HARQ buffer of the identified HARQ process.

2> else (i.e. retransmission):

3> if the uplink grant received on PDCCH was addressed to CS-RNTI and if the HARQ buffer of the identified process is empty; or 3> if the uplink grant is part of a bundle and if no MAC PDU has been obtained for this bundle; or 3> if the uplink grant is part of a bundle of the configured uplink grant, and the PUSCH duration of the uplink grant overlaps with a PUSCH duration of another uplink grant received on the PDCCH or in a Random Access Response for this Serving Cell; or > 3> if the MAC entity is configured with priority-BasedPrioritization and this uplink grant is not a prioritized uplink grant:
>> 4> ignore the uplink grant.
> 3> else:
>> 4> deliver the uplink grant and the HARQ information (redundancy version) of the TB to the identified HARQ process;
>> 4> instruct the identified HARQ process to trigger a retransmission:
>> 4> if the uplink grant is addressed to CS-RNTI; or
>> 4> if the uplink grant is addressed to C-RNTI, and the identified HARQ process is configured for a configured uplink grant:
>>> 5> start or restart the configuredGrantTimer, if configured, for the corresponding HARQ process when the transmission is performed.

When determining if NDI has been toggled compared to the value in the previous transmission the MAC entity shall ignore NDI received in all uplink grants on PDCCH for its Temporary C-RNTI.

Example 4: If/Assume CG Timer is Running

For each Serving Cell and each configured uplink grant, if configured and activated, the MAC entity shall:

> 1> if the MAC entity is configured with priorityBasedPrioritization; or
> 1> if the PUSCH duration of the configured uplink grant does not overlap with the PUSCH duration of an uplink grant received on the PDCCH or in a Random Access Response for this Serving Cell:
>> 2> set the HARQ Process ID to the HARQ Process ID associated with this PUSCH duration;
>> 2> if the configuredGrantTimer for the corresponding HARQ process is not running:
>>> 3> consider the NDI bit for the corresponding HARQ process to have been toggled;
>>> 3> deliver the configured uplink grant and the associated HARQ information to the HARQ entity.
>> 2> else if A:
>>> 3> deliver the configured uplink grant and the associated HARQ information to the HARQ entity.

A:

the previous uplink grant delivered to the HARQ entity for the same HARQ process was a configured uplink grant which was de-prioritized (i.e. retransmission on configured grant);

or a MAC PDU obtained in the identified HARQ buffer had not been (successful) transmitted (due to overlapping);

or the previous configured grant for the identified HARQ process was de-prioritized and a MAC PDU obtained in this HARQ buffer had not been (successful) transmitted (due to overlapping);

or the MAC entity is configured with priorityBasedPrioritization and the previous uplink grant delivered to the HARQ entity for the same HARQ process was a configured uplink grant which was de-prioritized (i.e. retransmission on configured grant);

or the MAC entity is configured with priorityBasedPrioritization and a MAC PDU obtained in the identified HARQ buffer had not been (successful) transmitted (due to overlapping);

or the MAC entity is configured with priorityBasedPrioritization and the previous configured grant for the identified HARQ process was de-prioritized and a MAC PDU obtained in this HARQ buffer had not been (successful) transmitted (due to overlapping);

(All the above options can be additional with the configuredGrantTimer for the corresponding HARQ process is running)

For each uplink grant, the HARQ entity shall:

> 1> identify the HARQ process associated with this grant, and for each identified HARQ process:
>> 2> if the received grant was not addressed to a Temporary C-RNTI on PDCCH, and the NDI provided in the associated HARQ information has been toggled compared to the value in the previous transmission of this TB of this HARQ process; or
>> 2> if the uplink grant was received on PDCCH for the C-RNTI and the HARQ buffer of the identified process is empty; or
>> 2> if the uplink grant was received in a Random Access Response; or
>> 2> if the uplink grant was received on PDCCH for the C-RNTI in ra-ResponseWindow and this PDCCH successfully completed the Random Access procedure initiated for beam failure recovery; or
>> 2> if the uplink grant is part of a bundle of the configured uplink grant, and may be used for initial transmission according to clause 6.1.2.3 of TS 38.214, and if no MAC PDU has been obtained for this bundle:
>>> 3> if there is a MAC PDU in the Msg3 buffer and the uplink grant was received in a Random Access Response; or:
>>> 3> if there is a MAC PDU in the Msg3 buffer and the uplink grant was received on PDCCH for the C-RNTI in ra-ResponseWindow and this PDCCH successfully completed the Random Access procedure initiated for beam failure recovery:
>>>> 4> obtain the MAC PDU to transmit from the Msg3 buffer.
>>>> 4> if the uplink grant size does not match with size of the obtained MAC PDU; and
>>>> 4> if the Random Access procedure was successfully completed upon receiving the uplink grant:
>>>>> 5> indicate to the Multiplexing and assembly entity to include MAC subPDU(s) carrying MAC SDU from the obtained MAC PDU in the subsequent uplink transmission;
>>>>> 5> obtain the MAC PDU to transmit from the Multiplexing and assembly entity.
>>> 3> else:
>>>> 4> if the MAC entity is not configured with priorityBasedPrioritization; or
>>>> 4> if the MAC entity is configured with priorityBasedPrioritization and this uplink grant is a prioritized uplink grant:
>>>>> 5> obtain the MAC PDU to transmit from the Multiplexing and assembly entity, if any:

3> if a MAC PDU to transmit has been obtained:
 4> deliver the MAC PDU and the uplink grant and the HARQ information of the TB to the identified HARQ process:
 4> instruct the identified HARQ process to tagger a new transmission;
 4> if the uplink grant is addressed to CS-RNTI; or
 4> if the uplink grant is a configured uplink grant; or
 4> if the uplink grant is addressed to C-RNTI, and the identified HARQ process is configured for a configured uplink grant:
  5> start or restart the configuredGrantTimer, if configured, for the corresponding HARQ process when the transmission is started;
  or
  at or after the start time of the corresponding PUSCH transmission;
  or
  at the first symbol of the corresponding PUSCH transmission;
  or
  after the first symbol of the corresponding PUSCH transmission;
  or
  when the transmission is performed (as MAC assumed or as MAC considered);
  or
  when the transmission is not dropped or not deprioritized;
  or
  with no condition. (the above description can be a note or additional condition)
 3> else:
  4> flush the HARQ buffer of the identified HARQ process.
2> else (i.e. retransmission):
 3> if the uplink grant received on PDCCH was addressed to CS-RNTI and if the HARQ buffer of the identified process is empty; or
 3> if the uplink grant is part of a bundle and if no MAC PDU has been obtained for this bundle; or
 3> if the uplink grant is part of a bundle of the configured uplink grant, and the PUSCH duration of the uplink grant overlaps with a PUSCH duration of another uplink grant received on the PDCCH or in a Random Access Response for this Serving Cell; or
 3> if the MAC entity is configured with priorityBasedPrioritization and this uplink grant is not a prioritized uplink grant:
  4> ignore the uplink grant.
 3> else:
  4> deliver the uplink grant and the HARQ information (redundancy version) of the TB to the identified HARQ process;
  4> instruct the identified HARQ process to trigger a retransmission:
  4> if the uplink grant is addressed to CS-RNTI; or
  4> if the MAC entity is configured with priorityBasedPrioritization and the uplink grant is a configured uplink grant;
  or
  if the MAC entity is configured with priorityBasedPrioritization and the uplink grant is a configured uplink grant, and the pervious uplink grant for the identified HARQ process is de-prioritized CG; or
  4> if the uplink grant is addressed to C-RNTI, and the identified HARQ process is configured for a configured uplink grant:
   5> start or restart the configuredGrantTimer, if configured, for the corresponding HARQ process when the transmission is performed.
When determining if NDI has been toggled compared to the value in the previous transmission the MAC entity shall ignore NDI received in all uplink grants on PDCCH for its Temporary C-RNTI.

Example 5: If/Assume CG Timer is Running

For each Serving Cell and each configured uplink grant, if configured and activated, the MAC entity shall:
 1> if the MAC entity is configured with priorityBasedPrioritization; or
 1> if the PUSCH duration of the configured uplink grant does not overlap with the PUSCH duration of an uplink grant received on the PDCCH or in a Random Access Response for this Serving Cell:
  2> set the HARQ Process ID to the HARQ Process ID associated with this PUSCH duration;
  2> if the configuredGrantTimer for the corresponding HARQ process is not running:
   3> consider the NDI bit for the corresponding HARQ process to have been toggled;
   3> deliver the configured uplink grant and the associated HARQ information to the HARQ entity.
  2> else if A:
   3> deliver the configured uplink grant and the associated HARQ information to the HARQ entity.
A:
 the previous uplink grant delivered to the HARQ entity for the same HARQ process was a configured uplink grant which was de-prioritized (i.e. retransmission on configured grant);
or
 a MAC PDU obtained in the identified HARQ buffer had not been (successful) transmitted (due to overlapping);
or
 the previous configured grant for the identified HARQ process was de-prioritized and a MAC PDU obtained in this HARQ buffer had not been (successful) transmitted (due to overlapping);
or
 the MAC entity is configured with priorityBasedPrioritization and the previous uplink grant delivered to the HARQ entity for the same HARQ process was a configured uplink grant which was de-prioritized (i.e. retransmission on configured grant);
or
 the MAC entity is configured with priorityBasedPrioritization and a MAC PDU obtained in the identified HARQ buffer had not been (successful) transmitted (due to overlapping);
or
 the MAC entity is configured with priorityBasedPrioritization and the previous configured grant for the identified HARQ process was de-prioritized and a MAC PDU obtained in this HARQ buffer had not been (successful) transmitted (due to overlapping);

(All the above options can be additional with the config-uredGrantTimer for the corresponding HARQ process is running)

For each uplink grant, the HARQ entity shall:

1> identify the HARQ process associated with this grant, and for each identified HARQ process:

2> if the received grant was not addressed to a Temporary C-RNTI on PDCCH, and the NDI provided in the associated HARQ information has been toggled compared to the value in the previous transmission of this TB of this HARQ process; or 2> if the uplink grant was received on PDCCH for the C-RNTI and the HARQ buffer of the identified process is empty; or 2> if the uplink grant was received in a Random Access Response; or 2> if the uplink grant was received on PDCCH for the C-RNTI in ra-ResponseWindow and this PDCCH successfully completed the Random Access procedure initiated for beam failure recovery; or 2> if the uplink grant is part of a bundle of the configured uplink grant, and may be used for initial transmission according to clause 6.1.2.3 of TS 38.214, and if no MAC PDU has been obtained for this bundle:

3> if there is a MAC PDU in the Msg3 buffer and the uplink grant was received in a Random Access Response; or:

3> if there is a MAC PDU in the Msg3 buffer and the uplink grant was received on PDCCH for the C-RNTI in ra-ResponseWindow and this PDCCH successfully completed the Random Access procedure initiated for beam failure recovery:

4> obtain the MAC PDU to transmit from the Msg3 buffer.

4> if the uplink grant size does not match with size of the obtained MAC PDU; and 4> if the Random Access procedure was successfully completed upon receiving the uplink grant:

5> indicate to the Multiplexing and assembly entity to include MAC subPDU(s) carrying MAC SDU from the obtained MAC PDU in the subsequent uplink transmission;

5> obtain the MAC PDU to transmit from the Multiplexing and assembly entity.

3> else:

4> if the MAC entity is not configured with priorityBasedPrioritization; or

4> if the MAC entity is configured with priorityBasedPrioritization and this uplink grant is a prioritized uplink grant:

5> obtain the MAC PDU to transmit from the Multiplexing and assembly entity, if any:

3> if a MAC PDU to transmit has been obtained:

4> deliver the MAC PDU and the uplink grant and the HARQ information of the TB to the identified HARQ process:

4> instruct the identified HARQ process to tagger a new transmission;

4> if the MAC entity is configured with priorityBasedPrioritization and the uplink grant is a de-prioritized configured grant:

or if the MAC entity is configured with priorityBasedPrioritization, the uplink grant is a configured uplink grant and this uplink grant is a deprioritized uplink grant:

5> start or restart the configuredGrantTimer, if configured, for the corresponding HARQ process.

4> if the uplink grant is addressed to CS-RNTI; or

4> if the uplink grant is a configured uplink grant; or

4> if the uplink grant is addressed to C-RNTI, and the identified HARQ process is configured for a configured uplink grant:

5> start or restart the configuredGrantTimer, if configured, for the corresponding HARQ process when the transmission is performed.

3> else:

4> flush the HARQ buffer of the identified HARQ process.

2> else (i.e. retransmission):

3> if the uplink grant received on PDCCH was addressed to CS-RNTI and if the HARQ buffer of the identified process is empty; or 3> if the uplink grant is part of a bundle and if no MAC PDU has been obtained for this bundle; or 3> if the uplink grant is part of a bundle of the configured uplink grant, and the PUSCH duration of the uplink grant overlaps with a PUSCH duration of another uplink grant received on the PDCCH or in a Random Access Response for this Serving Cell; or 3> if the MAC entity is configured with prioriyBasedPrioritization and this uplink grant is not a prioritized uplink grant:

4> ignore the uplink grant.

3> else:

4> deliver the uplink grant and the HARQ information (redundancy version) of the TB to the identified HARQ process;

4> instruct the identified HARQ process to trigger a retransmission:

4> if the uplink grant is addressed to CS-RNTI; or

4> if the MAC entity is configured with priorityBasedPrioritization and the uplink grant is a configured uplink grant;

or if the MAC entity is configured with priorityBasedPrioritization and the uplink grant is a configured uplink grant, and the previous uplink grant for the identified HARQ process is de-prioritized CG; or 4> if the uplink grant is addressed to C-RNTI, and the identified HARQ process is configured for a configured uplink grant:

5> start or restart the configuredGrantTimer, if configured, for the corresponding HARQ process when the transmission is performed.

When determining if NDI has been toggled compared to the value in the previous transmission the MAC entity shall ignore NDI received in all uplink grants on PDCCH for its Temporary C-RNTI.

FIG. 4 shows structure of a device 400 for transmitting a MAC PDU according to an implementation of the present disclosure. As shown in FIG. 4, the device 400 includes a HARQ entity 410 configured to: identify, for an uplink grant, a HARQ process associated with the uplink grant; and obtain a MAC PDU to transmit from a HARQ buffer of the identified HARQ process when at least one of following conditions is satisfied: a MAC entity of the HARQ entity

410 is configured with priority based prioritization, the uplink grant is a configured grant, and a previous uplink grant for the HARQ process was de-prioritized and the MAC PDU had already been obtained for the HARQ process; the uplink grant is a configured grant, the previous uplink grant for the HARQ process was de-prioritized and the MAC PDU had already been obtained for the HARQ process; a previous configured grant for the identified HARQ process was de-prioritized and the MAC PDU obtained in the HARQ buffer had not been successfully transmitted due to overlapping of a PUSCH duration of the previous uplink grant with a PUSCH duration of another uplink grant; or the MAC entity is configured with priority based prioritization, the previous configured grant for the identified HARQ process was de-prioritized and the MAC PDU obtained in the HARQ buffer had not been successfully transmitted due to the overlapping.

In an exemplary implementation, the HARQ entity 410 may be further configured to: obtain an MAC PDU to transmit from a multiplexing and assembly entity, when the MAC entity is not configured with priority based prioritization, or when the MAC entity is configured with priority based prioritization and the uplink grant is a prioritized uplink grant.

In an exemplary implementation, the HARQ entity 410 may be further configured to: after obtaining the MAC PDU to transmit, deliver the MAC PDU and the uplink grant and HARQ information of a TB to the identified HARQ process; and instruct the identified HARQ process to trigger a new transmission; wherein when the HARQ process is config- ured with a configured grant timer, the configured grant timer is not started or restarted when at least one of follow- ing conditions is satisfied: the MAC entity is configured with priority based prioritization and the uplink grant is a de- prioritized configured grant, or the MAC entity is configured with priority based prioritization, the uplink grant is a configured uplink grant and the uplink grant is a depriori- tized uplink grant.

In an exemplary implementation, the HARQ entity 410 may be further configured to: after obtaining the MAC PDU to transmit, deliver the MAC PDU and the uplink grant and HARQ information of a TB to the identified HARQ process; instruct the identified HARQ process to trigger a new transmission; and when the HARQ process is configured with a configured grant timer, start or restart the configured grant timer when the transmission is finished, or when the transmission succeeds, or at the end of a corresponding PUSCH transmission, or after the end of the corresponding PUSCH transmission, or in the first symbol after the end of the corresponding PUSCH transmission, or at the end of a corresponding PUSCH occasion, or when the MAC entity determines that the transmission is performed, or when the MAC entity determines that the transmission is not dropped or de-prioritized, or after the end of the corresponding PUSCH occasion.

In an exemplary implementation, the HARQ entity 410 may be further configured to: deliver the configured uplink grant and associated HARQ information to the HARQ entity 410 when at least one of following conditions is satisfied: the previous uplink grant delivered to the HARQ entity for the same HARQ process was a configured uplink grant which was de-prioritized; the MAC PDU obtained in the HARQ buffer of the identified HARQ process had not been suc- cessfully transmitted due to the overlapping; the previous configured grant for the identified HARQ process was de-prioritized and the MAC PDU obtained in the HARQ buffer of the HARQ process had not been successfully transmitted; the MAC entity is configured with priority based prioritization and the previous uplink grant delivered to the HARQ entity 410 for the same HARQ process was a configured uplink grant which was de-prioritized; the MAC entity is configured with priority based prioritization and the MAC PDU obtained in the HARQ buffer of the identified HARQ process had not been successfully transmitted due to the overlapping; or the MAC entity is configured with priority based prioritization and the previous configured grant for the identified HARQ process was de-prioritized and the MAC PDU obtained in the HARQ buffer of the HARQ process had not been successfully transmitted due to the overlapping.

In an exemplary implementation, the HARQ entity 410 may be further configured to: after obtaining the MAC PDU to transmit, deliver the MAC PDU and the uplink grant and HARQ information of a TB to the identified HARQ process; instruct the identified HARQ process to trigger a new transmission; and when the HARQ process is configured with a configured grant timer, start or restart the configured grant timer.

In an exemplary implementation, the HARQ entity 410 may be configured to start or restart the configured grant timer when the transmission is started, or at the start time of a corresponding PUSCH transmission, or after the start time of the corresponding PUSCH transmission, or at the first symbol of the corresponding PUSCH transmission, or after the first symbol of the corresponding PUSCH transmission, or when the MAC entity determines that the transmission is performed, or when the transmission is not dropped or not deprioritized.

Figure 5:
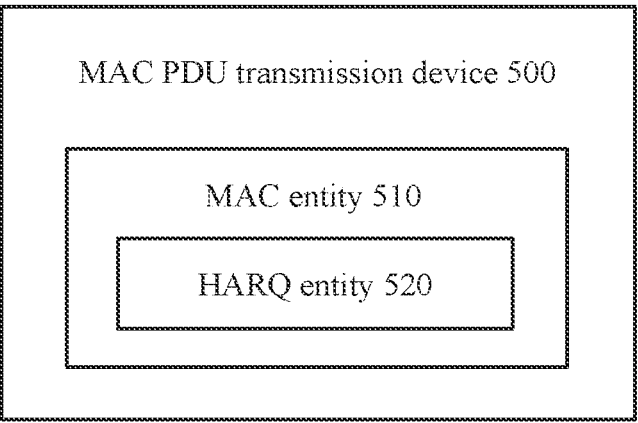
FIG. 5 shows structure of a device for transmitting a MAC PDU according to an implementation of the present disclosure.

FIG. 5 shows structure of a device 500 for transmitting a MAC PDU according to an implementation of the present disclosure. As shown in FIG. 5, the device 500 includes a MAC entity 510, and the MAC entity 510 includes a HARQ entity 520.

The MAC entity 510 is configured to deliver a configured uplink grant and associated HARQ information to the HARQ entity 520 when at least one of following conditions is satisfied: a previous uplink grant delivered to the HARQ entity 520 for a same HARQ process was a configured uplink grant which was de-prioritized; a MAC PDU obtained in a HARQ buffer of the HARQ process had not been successfully transmitted due to overlapping of a PUSCH duration of the previous uplink grant with a PUSCH duration of another uplink grant; the previous configured grant for the HARQ process was de-prioritized and the MAC PDU obtained in the HARQ buffer of the HARQ process had not been successfully transmitted due to the overlapping; the MAC entity 510 is configured with priority based prioritization and the previous uplink grant delivered to the HARQ entity 520 for the same HARQ process was a configured uplink grant which was de-prioritized; the MAC entity 510 is configured with priority based prioritization and the MAC PDU obtained in the HARQ buffer of the HARQ process had not been successfully transmitted due to the overlapping; or the MAC entity 510 is configured with priority based prioritization and the previous configured grant for the HARQ process was de-prioritized and the MAC PDU obtained in the HARQ buffer of the HARQ process had not been successfully transmitted due to the overlapping.

The HARQ entity 520 is configured to: deliver the uplink grant and the HARQ information of a transport block (TB) to the HARQ process; and instruct the HARQ process to trigger a retransmission.

In an exemplary implementation, the HARQ entity 520 may be further configured to: when the HARQ process is configured with a configured grant timer, start or restart the configured grant timer when the retransmission is performed, if at least one of following conditions is satisfied: the MAC entity 510 is configured with priority based prioritization and the uplink grant is a configured uplink grant; or the MAC entity 510 is configured with priority based prioritization and the uplink grant is a configured uplink grant, and the previous uplink grant for the HARQ process is a de-prioritized configured grant.

In an exemplary implementation, the HARQ entity 520 may be further configured to: identify, for the uplink grant, the HARQ process associated with the uplink grant; and in response to obtaining a MAC PDU, deliver the MAC PDU and the uplink grant and HARQ information of the TB to the identified HARQ process; instruct the identified HARQ process to trigger a new transmission; and when the HARQ process is configured with a configured grant timer, start or restart the configured grant timer when at least one of following conditions is satisfied: the MAC entity 510 is configured with priority based prioritization and the uplink grant is a de-prioritized configured grant; or the MAC entity 510 is configured with priority based prioritization, the uplink grant is a configured uplink grant and the uplink grant is a deprioritized uplink grant.

In an exemplary implementation, the HARQ entity 520 may be further configured to: identify, for the uplink grant, the HARQ process associated with the uplink grant; and in response to obtaining a MAC PDU, deliver the MAC PDU and the uplink grant and HARQ information of the TB to the identified HARQ process; instruct the identified HARQ process to trigger a new transmission; and when the HARQ process is configured with a configured grant timer, start or restart the configured grant timer.

In an exemplary implementation, the HARQ entity 520 may be configured to start or restart the configured grant timer when the transmission is started, or at the start time of a corresponding PUSCH transmission, or after the start time of the corresponding PUSCH transmission, or at the first symbol of the corresponding PUSCH transmission, or after the first symbol of the corresponding PUSCH transmission, or when the MAC entity 510 determines that the transmission is performed, or when the transmission is not dropped or not deprioritized.

One of ordinary skill in the art should understand that the device for transmitting a MAC PDU as described above in conjunction with FIG. 4 or FIG. 5 may be embodied in a terminal device. The terminal device herein may refer to user equipment (UE), an access terminal, a subscriber unit, a subscriber station, a mobile station, a rover station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with a wireless communication function, a computing device or other processing devices connected to a wireless modem, an on-board device, a wearable device, a terminal device in a 5G network, or a terminal device in an evolved public land mobile network (PLMN), etc.

Figure 6:
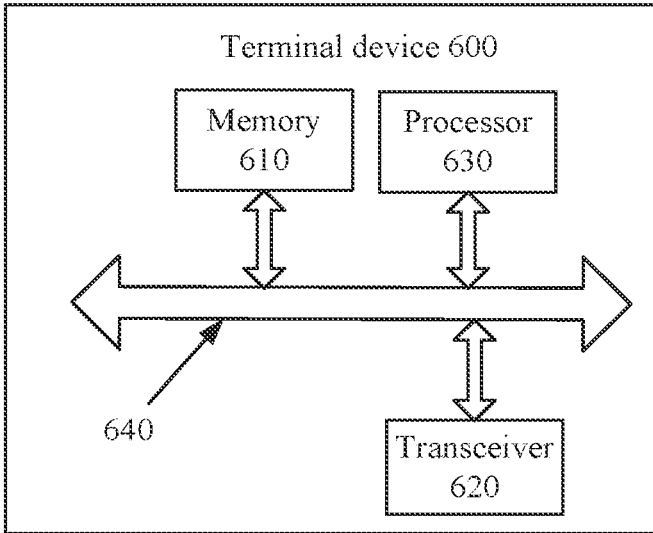
FIG. 6 shows structure of a terminal device according to an exemplary implementation of the present disclosure.

FIG. 6 shows structure of a terminal device 600 according to an exemplary implementation of the present disclosure. As shown in FIG. 6, the terminal device 600 may include a memory 610, a transceiver 620, and a processor 630. The memory 610 may be configured to store data and/or information. The memory 610 may be further configured to store instructions executable by the processor 630, and the processor 630 may be configured to execute the instructions stored in the memory 610 to control the transceiver 620 to receive and/or send signals. The terminal device 600 may further include a bus system 640, which may be configured to connect the components, such as the memory 610, the transceiver 620, and the processor 630, of the terminal device 600.

Herein, it should be understood that the memory 610 may include a read only memory and a random access memory, and may provide instructions and data to the processor 630. A portion of the memory 610 may further include a nonvolatile random access memory. For example, the memory 610 may further store device type information and/or other information.

The processor 630 may be a central processing unit (CPU) or other general-purpose processor, a digital signal processor (DSP), an application specific integrated circuit (ASIC), an off-the-shelf programmable gate array (FPGA) or other programmable logic device, a discrete gate or a transistor logic device, or a discrete hardware component, etc. The general-purpose processor may be a microprocessor or any conventional processor.

The bus system 640 may include, in addition to a data bus, a power bus, a control bus, a status signal bus, etc. However, for the sake of clarity, various buses are illustrated as the bus system 640 in FIG. 6.

The various acts of the exemplary implementations relating to the method for transmitting a MAC PDU as shown FIG. 2 or FIG. 3 may be implemented by instructions of software or integrated logic circuits of hardware or combination of software and hardware. The software modules may be located in a typical storage medium in the art such as a random access memory, a flash memory, a read-only memory, a programmable read-only memory, an electrically erasable programmable memory, a register, etc. The storage medium may be located in the memory 610, and the processor 630 may read and execute the instructions stored in the storage medium to implement the acts of the method.

Further, an implementation of the present disclosure provides a computer readable storage medium. The computer readable storage medium may store instructions that are executable by a computer or processor to implement any of the aforementioned method for transmitting a MAC PDU and/or any exemplary implementation thereof.

It should be understood that in various implementations of the present disclosure, the term "and/or" is used to describe an association relationship between associated objects, indicating that there may be three relationships, for example, a and/or b may indicate three situations: A alone, A and B. and B alone. In addition, the symbol "/" in the present disclosure generally indicates that objects of the former and the latter connected by "/" has an "or" relationship.

What are described above are merely exemplary implementations of the present disclosure. Although the exemplary implementations have been described in considerable detail above, numerous variations and modifications will become apparent to those skilled in the art once the above disclosure is fully appreciated. It is intended that the following claims be interpreted to embrace all such variations and modifications.

The invention claimed is:
1. A method for transmitting a medium access control (MAC) protocol data unit (PDU), comprising:

identifying, by a hybrid automatic repeat request (HARQ) entity, for an uplink grant, a HARQ process associated with the uplink grant; and obtaining, by the HARQ entity, a MAC PDU to transmit from a HARQ buffer of the identified HARQ process when at least one of following conditions is satisfied:

a MAC entity of the HARQ entity is configured with priority based prioritization, and a previous uplink grant for the HARQ process was de-prioritized and the MAC PDU had already been obtained for the HARQ process;

the previous uplink grant for the HARQ process was de-prioritized and the MAC PDU had already been obtained for the HARQ process;

a previous configured grant for the identified HARQ process was de-prioritized and the MAC PDU obtained in the HARQ buffer had not been successfully transmitted due to overlapping of a physical uplink shared channel (PUSCH) duration of the previous uplink grant with a PUSCH duration of another uplink grant; or the MAC entity is configured with priority based prioritization, the previous configured grant for the identified HARQ process was de-prioritized and the MAC PDU obtained in the HARQ buffer had not been successfully transmitted due to the overlapping;

wherein the uplink grant is a configured grant, and the method further comprises:

after obtaining the MAC PDU to transmit from the HARQ buffer of the identified HARQ process, delivering, by the HARQ entity, the MAC PDU and the uplink grant and HARQ information of a transport block (TB) to the identified HARQ process; and instructing, by the HARQ entity, the identified HARQ process to trigger a new transmission of which a new data indicator (NDI) bit for the HARQ process is considered as having been toggled, to autonomously retransmit the MAC PDU obtained from the HARQ buffer.

2. The method of claim 1, further comprising:

delivering, by the MAC entity, the configured uplink grant and associated HARQ information to the HARQ entity when at least one of following conditions is satisfied:

the previous uplink grant delivered to the HARQ entity for the same HARQ process was a configured uplink grant which was de-prioritized;

the previous configured grant for the identified HARQ process was de-prioritized and the MAC PDU obtained in the HARQ buffer of the HARQ process had not been successfully transmitted.

3. The method of claim 2, further comprising:

when the HARQ process is configured with a configured grant timer, starting or restarting, by the HARQ entity, the configured grant timer.

4. The method of claim 3, wherein starting or restarting the configured grant timer comprises:

starting or restarting the configured grant timer when the MAC entity determines that the transmission is performed.

5. The method of claim 1, wherein when the HARQ process is configured with a configured grant timer, the configured grant timer is not started or restarted when at least one of following conditions is satisfied:

the MAC entity is configured with priority based prioritization and the uplink grant is a de-prioritized configured grant; or the MAC entity is configured with priority based prioritization, the uplink grant is a configured uplink grant and the uplink grant is a deprioritized uplink grant.

6. A method for transmitting a medium access control (MAC) protocol data unit (PDU), comprising:

delivering, by a MAC entity, an uplink grant and associated HARQ information to a HARQ entity of the MAC entity when at least one of following conditions is satisfied:

a previous uplink grant delivered to the HARQ entity for a same HARQ process was a configured uplink grant which was de-prioritized;

a MAC PDU obtained in a HARQ buffer of the HARQ process had not been successfully transmitted due to overlapping of a physical uplink shared channel (PUSCH) duration of the previous uplink grant with a PUSCH duration of another uplink grant;

the previous configured grant for the HARQ process was de-prioritized and the MAC PDU obtained in the HARQ buffer of the HARQ process had not been successfully transmitted due to the overlapping;

the MAC entity is configured with priority based prioritization and the previous uplink grant delivered to the HARQ entity for the same HARQ process was a configured uplink grant which was de-prioritized;

the MAC entity is configured with priority based prioritization and the MAC PDU obtained in the HARQ buffer of the HARQ process had not been successfully transmitted due to the overlapping; or the MAC entity is configured with priority based prioritization and the previous configured grant for the HARQ process was de-prioritized and the MAC PDU obtained in the HARQ buffer of the HARQ process had not been successfully transmitted due to the overlapping;

delivering, by the HARQ entity, the uplink grant and the HARQ information of a transport block (TB) to the HARQ process; and instructing, by the HARQ entity, the HARQ process to trigger an autonomous retransmission, wherein the uplink grant is a configured grant;

the method further comprising:

identifying, by the HARQ entity, for the uplink grant, the HARQ process associated with the uplink grant; and in response to obtaining a MAC PDU from a HARQ buffer of the identified HARQ process, delivering, by the HARQ entity, the MAC PDU and the uplink grant and HARQ information of the TB to the identified HARQ process;

instructing, by the HARQ entity, the identified HARQ process to trigger a new transmission of which a new data indicator (NDI) bit for the HARQ process is considered as having been toggled, to autonomously retransmit the MAC PDU obtained from the HARQ buffer.

7. The method of claim 6, wherein:

when the HARQ process is configured with a configured grant timer, the configured grant timer is started or restarted when at least one of following conditions is satisfied:

the MAC entity is configured with priority based prioritization and the uplink grant is a de-prioritized configured grant; or the MAC entity is configured with priority based prioritization, the uplink grant is a configured uplink grant and the uplink grant is a deprioritized uplink grant.

8. The method of claim 6, further comprising:

when the HARQ process is configured with a configured grant timer, starting or restarting the configured grant timer when the MAC entity determines that the transmission is performed.

9. A device for transmitting a medium access control (MAC) protocol data unit (PDU), a memory and a processor, wherein the memory is configured to store instructions executable by the processor, and the processor is configured to execute the instructions stored in the memory to perform operations of a hybrid automatic repeat request (HARQ) entity, wherein the HARQ entity is configured to:

identify, for an uplink grant, a HARQ process associated with the uplink grant; and obtain a MAC PDU to transmit from a HARQ buffer of the identified HARQ process when at least one of following conditions is satisfied:

a MAC entity of the HARQ entity is configured with priority based prioritization, and a previous uplink grant for the HARQ process was de-prioritized and the MAC PDU had already been obtained for the HARQ process;

the previous uplink grant for the HARQ process was de-prioritized and the MAC PDU had already been obtained for the HARQ process;

a previous configured grant for the identified HARQ process was de-prioritized and the MAC PDU obtained in the HARQ buffer had not been successfully transmitted due to overlapping of a physical uplink shared channel (PUSCH) duration of the previous uplink grant with a PUSCH duration of another uplink grant; or the MAC entity is configured with priority based prioritization, the previous configured grant for the identified HARQ process was de-prioritized and the MAC PDU obtained in the HARQ buffer had not been successfully transmitted due to the overlapping;

wherein the uplink grant is a configured grant, and the HARQ entity is further configured to:

after obtaining the MAC PDU to transmit from the HARQ buffer of the identified HARQ process, deliver the MAC PDU and the uplink grant and HARQ information of a transport block (TB) to the identified HARQ process; and instruct the identified HARQ process to trigger a new transmission of which a new data indicator (NDI) bit for the HARQ process is considered as having been toggled, to autonomously retransmit the MAC PDU obtained from the HARQ buffer.

10. The device of claim 9, wherein the MAC entity of the HARQ entity is configured to:

deliver the configured uplink grant and associated HARQ information to the HARQ entity when at least one of following conditions is satisfied:

the previous uplink grant delivered to the HARQ entity for the same HARQ process was a configured uplink grant which was de-prioritized;

the previous configured grant for the identified HARQ process was de-prioritized and the MAC PDU obtained in the HARQ buffer of the HARQ process had not been successfully transmitted.

11. The device of claim 10, wherein when the HARQ process is configured with a configured grant timer, the HARQ entity is further configured to:

start or restart the configured grant timer.

12. The device of claim 11, wherein the HARQ entity is configured to start or restart the configured grant timer when the MAC entity determines that the transmission is performed.

13. The device of claim 9, wherein when the HARQ process is configured with a configured grant timer, the configured grant timer is not started or restarted when at least one of following conditions is satisfied:

the MAC entity is configured with priority based prioritization and the uplink grant is a de-prioritized configured grant; or the MAC entity is configured with priority based prioritization, the uplink grant is a configured uplink grant and the uplink grant is a deprioritized uplink grant.

14. A device for transmitting a medium access control (MAC) protocol data unit (PDU), a memory and a processor, wherein the memory is configured to store instructions executable by the processor, and the processor is configured to execute the instructions stored in the memory to perform operations of a MAC entity, the MAC entity comprising a hybrid automatic repeat request (HARQ) entity, wherein:

the MAC entity is configured to deliver an uplink grant and associated HARQ information to the HARQ entity when at least one of following conditions is satisfied:

a previous uplink grant delivered to the HARQ entity for a same HARQ process was a configured uplink grant which was de-prioritized;

a MAC PDU obtained in a HARQ buffer of the HARQ process had not been successfully transmitted due to overlapping of a physical uplink shared channel (PUSCH) duration of the previous uplink grant with a PUSCH duration of another uplink grant;

the previous configured grant for the HARQ process was de-prioritized and the MAC PDU obtained in the HARQ buffer of the HARQ process had not been successfully transmitted due to the overlapping;

the MAC entity is configured with priority based prioritization and the previous uplink grant delivered to the HARQ entity for the same HARQ process was a configured uplink grant which was de-prioritized;

the MAC entity is configured with priority based prioritization and the MAC PDU obtained in the HARQ buffer of the HARQ process had not been successfully transmitted due to the overlapping; or the MAC entity is configured with priority based prioritization and the previous configured grant for the HARQ process was de-prioritized and the MAC PDU obtained in the HARQ buffer of the HARQ process had not been successfully transmitted due to the overlapping;

the HARQ entity is configured to:

deliver the uplink grant and the HARQ information of a transport block (TB) to the HARQ process; and instruct the HARQ process to trigger an autonomous retransmission, wherein the uplink grant is a configured grant;

wherein the HARQ entity is further configured to:

identify, for the uplink grant, the HARQ process associated with the uplink grant; and in response to obtaining a MAC PDU from a HARQ buffer of the identified HARQ process, deliver the MAC PDU and the uplink grant and HARQ information of the TB to the identified HARQ process;

instruct the identified HARQ process to trigger a new transmission of which a new data indicator (NDI) bit for the HARQ process is considered as having been toggled, to autonomously retransmit the MAC PDU obtained from the HARQ buffer.

15. The device of claim 14, wherein when the HARQ process is configured with a configured grant timer, the HARQ entity is further configured to:

start or restart the configured grant timer when at least one of following conditions is satisfied:

the MAC entity is configured with priority based prioritization and the uplink grant is a de-prioritized configured grant; or the MAC entity is configured with priority based prioritization, the uplink grant is a configured uplink grant and the uplink grant is a deprioritized uplink grant.

16. The device of claim 14, wherein when the HARQ process is configured with a configured grant timer, the HARQ entity is configured to start or restart the configured grant timer when the MAC entity determines that the transmission is performed.

* * * * *